United States Patent
Luo et al.

(10) Patent No.: US 7,818,492 B2
(45) Date of Patent: Oct. 19, 2010

(54) SOURCE AND SHADOW WEAR-LEVELING METHOD AND APPARATUS

(75) Inventors: Jianjun Luo, Sunnyvale, CA (US); Chris Tsu, Saratoga, CA (US); Charles Chung Lee, Cupertino, CA (US); David Queichang Chow, San Jose, CA (US)

(73) Assignee: SuperTalent Electronics, Inc., San Jose, CA (US)

( * ) Notice: Subject to any disclaimer, the term of this patent is extended or adjusted under 35 U.S.C. 154(b) by 614 days.

(21) Appl. No.: 11/767,417

(22) Filed: Jun. 22, 2007

(65) Prior Publication Data

US 2007/0276987 A1    Nov. 29, 2007

Related U.S. Application Data

(63) Continuation-in-part of application No. 10/957,089, filed on Oct. 1, 2004, now abandoned, and a continuation-in-part of application No. 10/956,826, filed on Oct. 1, 2004, now Pat. No. 7,299,316, and a continuation-in-part of application No. 10/789,333, filed on Feb. 26, 2004, now Pat. No. 7,318,117.

(51) Int. Cl.
  *G06F 13/00* (2006.01)
(52) U.S. Cl. ........................................................ 711/103
(58) Field of Classification Search ........................ None
  See application file for complete search history.

(56) References Cited

U.S. PATENT DOCUMENTS

| 7,407,393 | B2 | 8/2008 | Ni et al. | |
|---|---|---|---|---|
| 7,420,803 | B2 | 9/2008 | Hsueh et al. | |
| 2002/0013879 | A1* | 1/2002 | Han | 711/103 |
| 2003/0156473 | A1* | 8/2003 | Sinclair et al. | 365/200 |
| 2004/0210706 | A1* | 10/2004 | In et al. | 711/103 |
| 2005/0160218 | A1* | 7/2005 | See et al. | 711/103 |
| 2007/0276988 | A1* | 11/2007 | Luo et al. | 711/103 |

* cited by examiner

*Primary Examiner*—Sheng-Jen Tsai
*Assistant Examiner*—Sean Rossiter
(74) *Attorney, Agent, or Firm*—Maryam Iman; IPxLaw Group LLP

(57) ABSTRACT

A flash memory system includes flash memory organized into a plurality of blocks of pages for storage of information, a page including data and spare, the blocks being identifiable, within the flash memory, by a physical address. The system further has a flash controller for communicating with a host and the flash memory and includes volatile memory for storing a source-shadow table of logical addresses identifying blocks addressable by the physical addresses. The source-shadow table has an address mapping table and a property value table. The property value table is used to store property values, each of which is associated with a block of a predetermined group of blocks and is indicative of the number of times a block has been written since the last erase operation performed thereon. The property values correspond to the logical addresses of the address mapping table, wherein a block having been written no more than two times is re-written to different areas of the flash memory without requiring an erase operation.

29 Claims, 19 Drawing Sheets

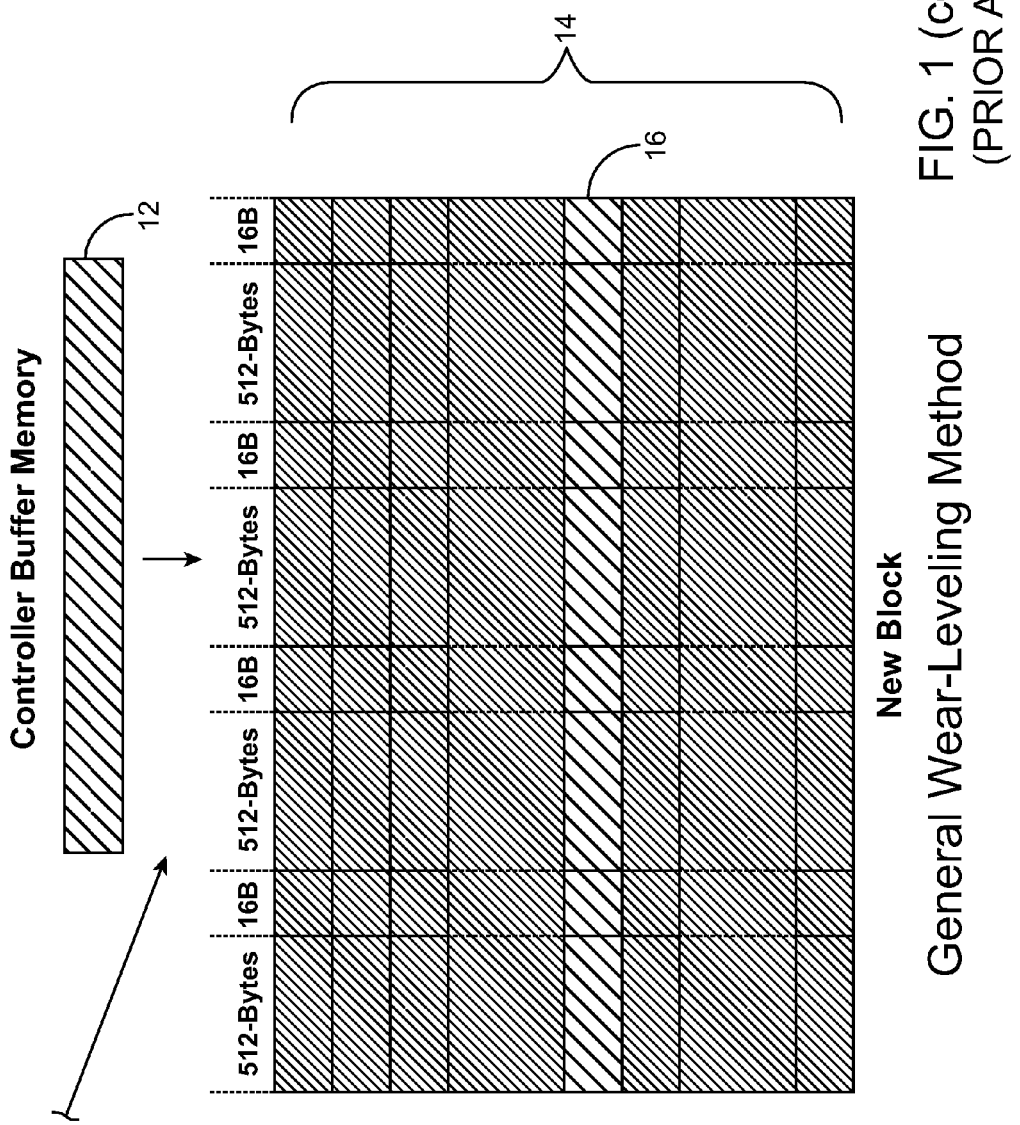
FIG. 1 (cont.) (PRIOR ART)
General Wear-Leveling Method

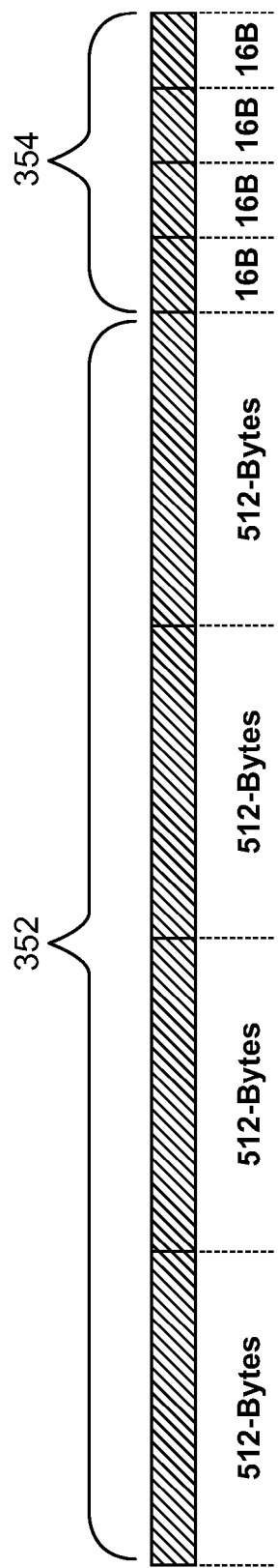
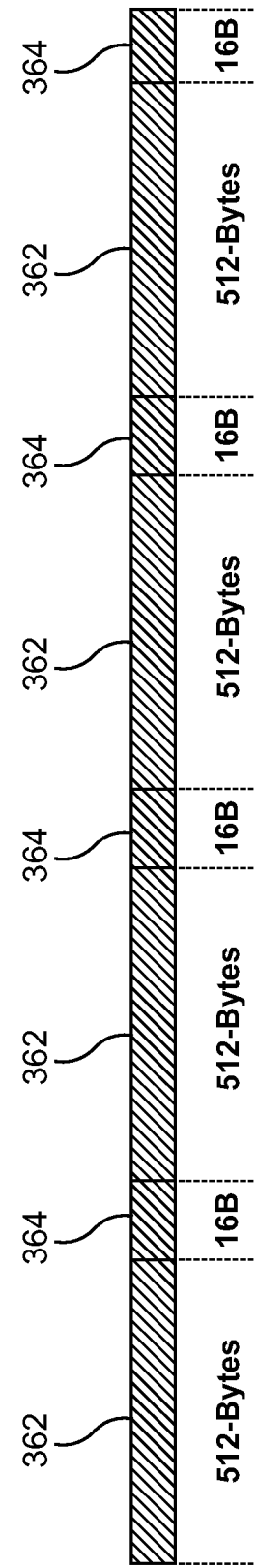
FIG. 3(a) (4*512B + 4*16B) Page
FIG. 3(b) 4* (512B + 16B) Page

|        | 0  | 1  | 2  | 3  | 4  | 5  | 6  | 7  | 8  | 9  | A  | B  | C  | D  | E  | F  |
|--------|----|----|----|----|----|----|----|----|----|----|----|----|----|----|----|----|
| 0x000  | 06 | 06 | 08 | 09 | 0A | 0B | 20 | 21 | 22 | 23 | 56 | 56 | 57 | 58 | 59 | 5A |
| 0x010  | 98 | 99 | B1 | B2 | B3 | B4 | B5 | B6 | B7 | B8 | B9 | 01 | 02 | 03 | 04 | 05 |
| 0x020  | FE | 07 | FF | FF | FF | FF | FF | FF | FF | FF | FF | FF | FF | FF | FF | FF |
| 0x030  | FF | FF | FF | FF | FF | FF | FF | FF | FF | FF | FF | FF | FF | FF | FF | FF |
| 0x0E0  | FF | FF | FF | FF | FF | FF | FF | FF | FF | FF | FF | FF | FF | FF | FF | FF |
| 0x0F0  | FF | FF | FF | FF | FF | FF | FF | FF | FF | FF | FF | FF | FF | FF | FF | FF |
| 0x100  | 00 | 01 | 00 | 00 | 00 | 00 | 00 | 00 | 00 | 00 | 00 | 01 | 00 | 00 | 00 | 00 |
| 0x110  | 00 | 00 | 00 | 00 | 00 | 00 | 00 | 00 | 00 | 00 | 00 | 00 | 00 | 00 | 00 | 00 |
| 0x120  | FE | 00 | FF | FF | FF | FF | FF | FF | FF | FF | FF | FF | FF | FF | FF | FF |
| 0x130  | FF | FF | FF | FF | FF | FF | FF | FF | FF | FF | FF | FF | FF | FF | FF | FF |
| 0x1E0  | FF | FF | FF | FF | FF | FF | FF | FF | FF | FF | FF | FF | FF | FF | FF | FF |
| 0x1F0  | FF | FF | FF | FF | FF | FF | FF | FF | FF | FF | FF | FF | FF | FF | FF | FF |

800 — 802 Mapping Table / 804 Property Table

FIG. 8

Original Status of the Source Block and the Shadow Block

Original Status of the Source Block and the Shadow Block

After Merging

SOURCE AND SHADOW WEAR-LEVELING METHOD AND APPARATUS

CROSS REFERENCE TO RELATED APPLICATIONS

This application is a continuation-in part of U.S. Patent Publication No. US 2006/0075395 A1, entitled "Flash Card System", filed on Oct. 1, 2004, by Lee et al., and is a continuation-in-part of U.S. Patent Publication No. US 2005/0193162 A1, entitled "USB Card Reader", filed on Oct. 1, 2004 by Horng-Yee Chou et al., which is a continuation-in-part of U.S. patent application Ser. No. 10/789,333, entitled "System and Method for Controlling Flash Memory", filed on Feb. 26, 2004, by Lee et al., the disclosures of which are incorporated herein by reference as though set forth in full. This application further incorporates, herein by reference, the disclosure of U.S. Pat. No. 7,082,056, entitled "Flash Memory Device and Architecture with Multi Level Cells", filed on Mar. 12, 2004 by Ben W. Chen et al., and issued on Jul. 25, 2006.

BACKGROUND OF THE INVENTION

1. Field of the Invention

This invention relates to the field of digital systems employing non-volatile (or flash) memory and particularly to wear-leveling memory cells of the flash memory.

2. Description of the Prior Art

Solid state memory or non-volatile memory, in the form of flash, is readily employed in numerous applications requiring saving and retrieving digital information. Some use thereof includes memory sticks, disk drives, personal digital assistants (PDAs) and other digital mobile devices.

NAND flash memory is a type of flash memory constructed from electrically-erasable programmable read-only memory (EEPROM) cells, which are an array of floating gate transistors. NAND refers to the type of gate used in the flash memory. NAND flash memory uses tunnel injection for write and tunnel release during erase operations. NAND flash, which is a type of non-volatile memory, is ideal for storage of digital information in portable devices.

However, NAND flash memory does have limitations. Namely, in flash, digital information or data is stored as binary information, i.e. '1' or '0'. One limitation posed by NAND flash memory is that during storage of data, which occurs during writing to or programming of the flash memory, data that is '1's can only be stored in the flash memory. Data that is '0's cannot be store until erase occurs of the previously-stored data. In fact, when writing from a state of '0' to a state of '1', the flash memory needs to be erased a "block" at a time, which is undesirable as it adversely affects performance by way of efficiency. The reason for the requirement for erasing a "block" at a time is that while the smallest unit for a read or program operation to NAND flash memory is a byte (eight bits) or a word, the smallest unit for erase is a block. A bit of information or data is represented by a '1' or '0'. A block refers to one or more pages of information made of bytes or words and the block is an erasable unit. An exemplary page size is 2,112 bytes, 2024 bytes of which are typically reserved for data and 64 bytes of which are typically reserved for spare. Spare being overhead information, such as address flag, error correction code (ECC) or other non-data information. The structure of a page can be either 4*512+4*16 bytes or 4*(512+16) bytes, the 512 bytes being used for data and the 16 bytes for spare. The structure of a page may be other than the foregoing but essentially similar in the type of information included therein.

Single Level Cell (SLC) flash memory and Multi Level Cell (MLC) flash memory are two types of NAND flash memory. The erase block size of SLC flash is 128K+4K bytes and the erase block size of MLC flash is 256K+8K bytes. Thus, erase operations severely impact performance, particularly, when performed on large capacity memory. Another limitation of NAND flash memory is having a finite numbers of times of erase cycles before it becomes unreliable. The number of erase operations that may be performed on NAND flash memory reliably is known to be limited to 10,000 to 1,000,000.

FIG. 1 shows a diagram of the manner in which a block is re-written using current wear leveling techniques. During a write operation in which a block of information is previous written thereto and is now being re-written, which occurs readily when a host re-writes a file, the block 10, which is shown to include 128 pages with each page being 2024 bytes of data and 64 bytes of overhead or spare, is essentially moved to a different block, or a new block 14. Re-written information, which is shown to be included in the buffer memory controller 12 is written into a corresponding location of the new block 16 and the remaining information that is not being re-written of the block 10 is then moved to the block 16. The old block 18, which is essentially the block 10 is then erased. The problem with this technique is that each time there is a re-writing of a block, an erase operation needs to be performed thereby adversely affecting the life span of the memory cells within the flash memory.

Additionally, the life time of the MLC flash memory is limited to 10,000 erase cycles or operations. An entire block must be erased in MLC flash memory before a page can be re-programmed. Therefore, wear leveling techniques are needed to address the MLC flash re-programming problem.

Wear leveling is a technique used to distribute use of the memory cells within the MLC and/or SLC or any other type of non-volatile (or flash) memory evenly thereby extending the lifetime of the latter. In performing wear leveling, a memory controller is used to re-map logical addresses, used by a host to identify addresses into which information is to be written or read from, to different physical addresses, used by the memory controller to address the flash memory to store or read information from the host, so that write operations are evenly distributed among the memory cells thereby extending the endurance of the flash memory.

In light of the foregoing, there is a need for flash memory to have increased reliability.

SUMMARY OF THE INVENTION

Briefly, an embodiment of the present invention includes a flash memory system includes flash memory organized into a plurality of blocks of pages for storage of information, a page including data and spare, the blocks being identifiable, within the flash memory, by a physical address. The system further has a flash controller for communicating with a host and the flash memory and includes volatile memory for storing a source-shadow table of logical addresses identifying blocks addressable by the physical addresses. The source-shadow table includes an address mapping table and a property value table. The property value table is used to store property values, each of which is associated with a block of a predetermined group of blocks and is indicative of the number of times a block has been written. The property values correspond to logical addresses of the address mapping table, wherein a block having been written no more than twice, is re-written to different areas of the flash memory without requiring an erase operation.

The foregoing and other objects, features and advantages of the invention will be apparent from the following detailed description of the preferred embodiments which made reference to the several figures of the drawing.

IN THE DRAWING

FIG. 1 shows a diagram of the manner in which a block is re-written using current wear leveling techniques.

FIG. 2 shows a flash (or non-volatile) memory system 200 to include a flash controller 202 and a flash memory 204, in accordance with an embodiment of the present invention.

FIG. 3 shows an example of a block including 64 pages with each page having 2K bytes of data area and 64 bytes of spare area.

FIGS. 3(a) and 3(b) show different structures, as examples, of a page of FIG. 3.

FIGS. 4-7 show exemplary contents of the source and/or shadow blocks within the flash memory 204, of FIG. 2.

FIG. 8 shows a source-shadow table 800 including a mapping table 802 and a property value 804, in accordance with an embodiment of the present invention.

DETAILED DESCRIPTION OF THE PREFERRED EMBODIMENTS

In an embodiment of the present invention, a source-shadow wear-leveling apparatus and method is introduced for flash memory. A mapping is done of logical block addresses and physical block addresses and a block property value indicates if a block to be written is a source or a shadow block thereby reducing the number of erase operations performed on blocks to improve the reliability of flash memory.

Figure 1:
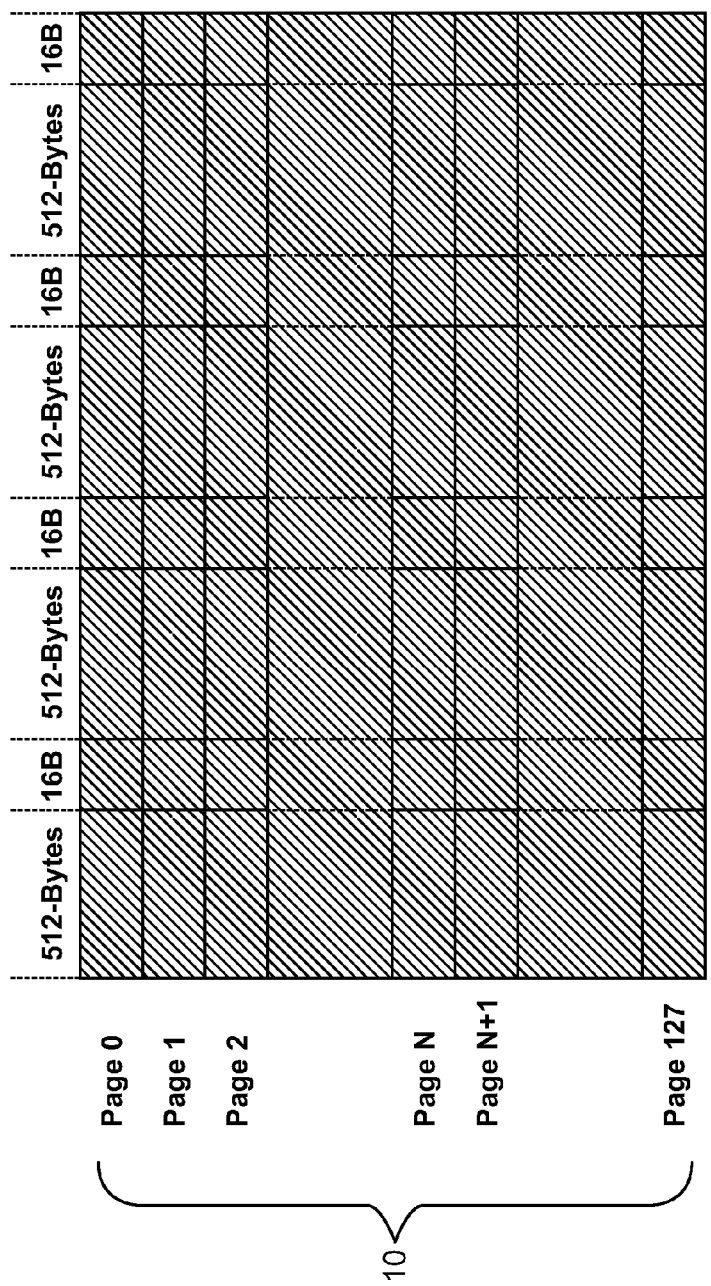
Figure 1:
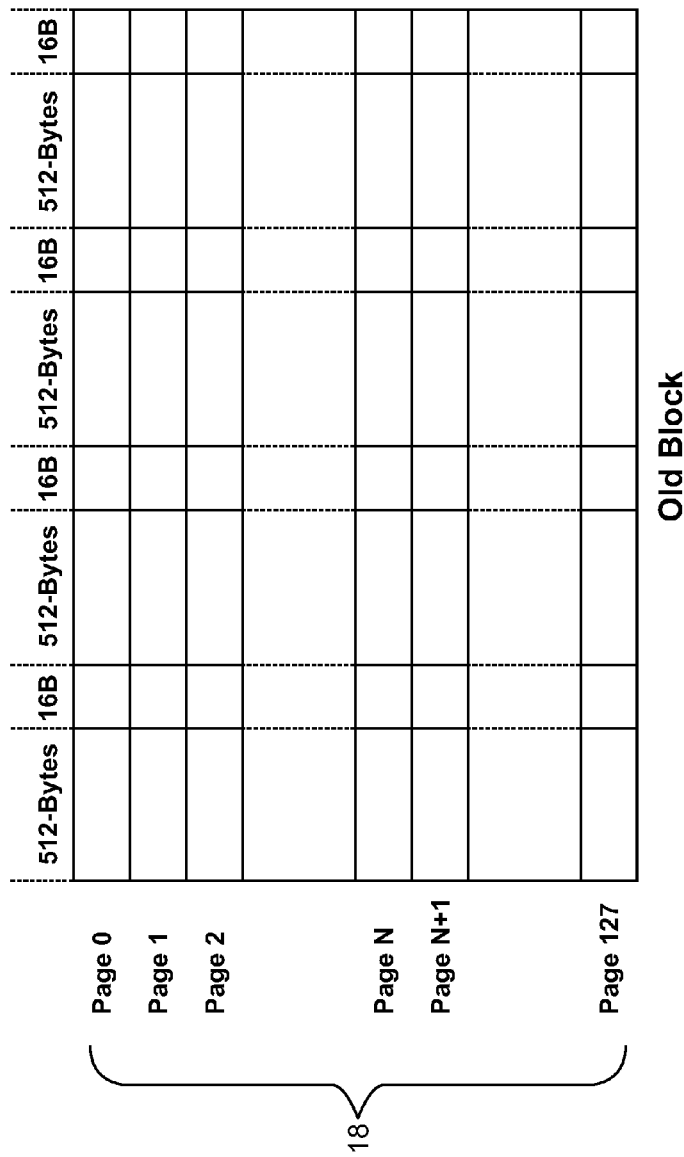
Figure 2:
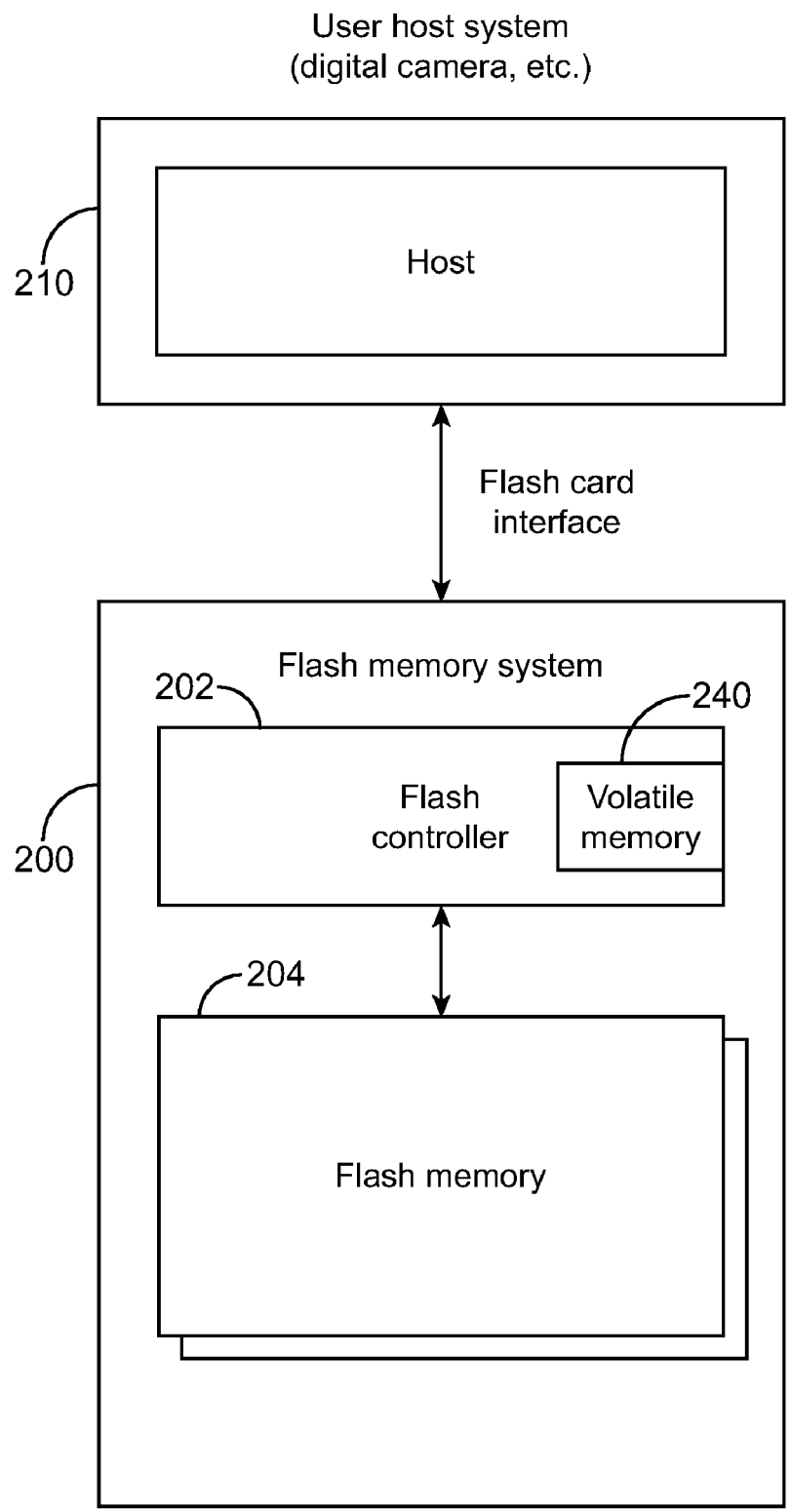

Referring now to FIG. 2, a flash (or non-volatile) memory system 200, which may be a part of a computer (personal computer (PC)), digital camera and the like is shown in accordance with an embodiment of the present invention, to include a flash controller 202 and a flash memory 204. The flash memory 204 is made of an array of non-volatile or flash memory, either in the form of an array or otherwise, for storing digital information and is organized into blocks of pages and is programmed or written thereto using the various techniques to be discussed shortly in accordance with the teachings of the present invention. The term flash memory represents one or more flash memory devices. The flash memory system 200 is shown coupled to a host 210 for communicating information to be stored into the flash memory 204. The flash memory 204 may be MLC or SLC or any other type of non-volatile memory.

The flash memory system 200 may be implemented as a printed circuit board (PCB) or flash card. Information stored in the flash memory system 200 is of various types such as images and other types of multimedia information. Accordingly, the flash memory system 200 can also be referred to as a multimedia card (MMC). The flash memory 204 is shown to include volatile memory 250 for temporary storage of information including data and spare being written by the host 210, as will be shortly discussed. Volatile memory 250 is any type of read-writable memory, such as random access memory (RAM). Volatile memory 250 may be referred to as buffer 250.

The host 210 handles flash card protocol translations between the flash memory system 200 and the host 210, which enables the host 210 to transfer files so that various host operating system (OS) software can share information. Software in the user host 210 handles file system functions, such as providing a file application interface and providing a user accessible device driver.

Wear leveling, performed on the flash memory 204, is improves reliability and life time thereof. For example, the lower the number of erase operations performed on the memory cells of the flash memory 204, the more reliable and lower the rate of defectiveness the latter remain. For applications, such as compact discs, reliability, using wear leveling, is significantly improved because the number of times a file is re-written is fairly limited.

Figure 3:
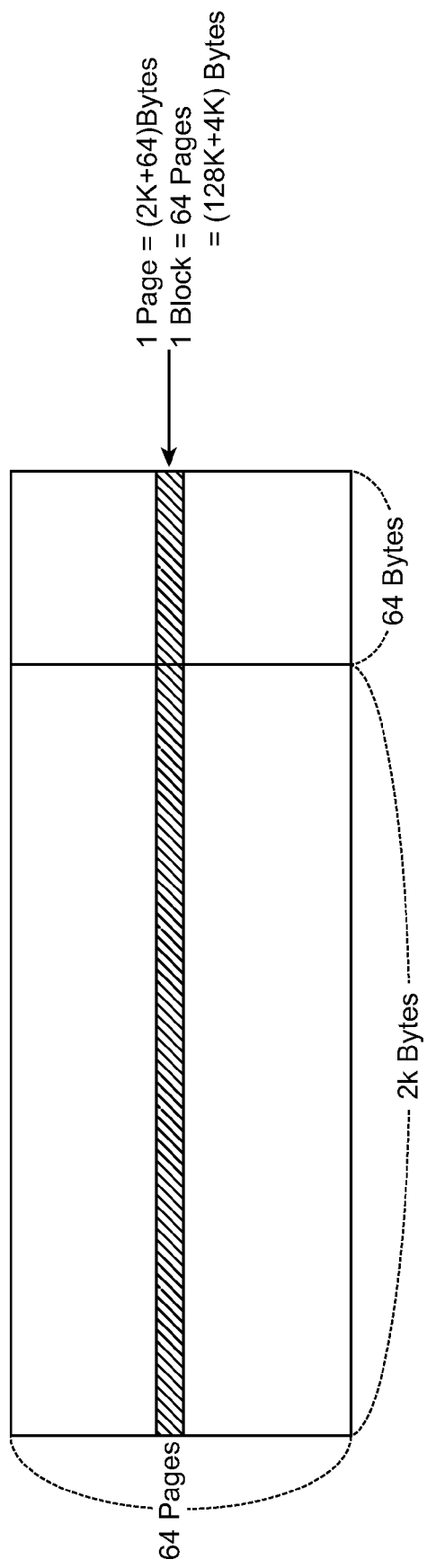

FIG. 3 shows an example of a block including 64 pages with each page having 2K bytes of data and 64 bytes of spare. FIGS. 3(a) and 3(b) show different structures, as examples, of a page of FIG. 3. The pages of the block are written thereto by the host in accordance with the embodiments and methods of the present invention. In FIG. 3(a), a page is shown to include 4*512 bytes of data in a data area 352 and 4*16 bytes of spare in a spare area 354. Each of the 512 bytes of data has a corresponding 16 byte spare located in the spare area 354. Each 512 bytes of data and its corresponding spare are at times referred to as sector. Thus, in FIG. 3(a), the four 512 bytes of data are sequentially located or located adjacent to each other and each of their corresponding spares are located after the data area 352 but also in sequential order.

In FIG. 3(b), a page 360 is shown to include 4*(512 bytes+ 16 bytes) where each of the 512 bytes of data 362 are of data in a data area 352 and 4*16 bytes of spare in a spare area 354. Each of the 512 bytes of data has a corresponding 16 byte spare located in the spare area 354. Each 512 bytes of data 362 and its corresponding spare 364 are at times referred to as sector. In FIG. 3(b) each of the data 362 and corresponding spare 364 are shown adjacent to each other and adjacent to the data-spare pair is located the next 512 bytes of data 364 and its corresponding spare 364.

Figure 4:
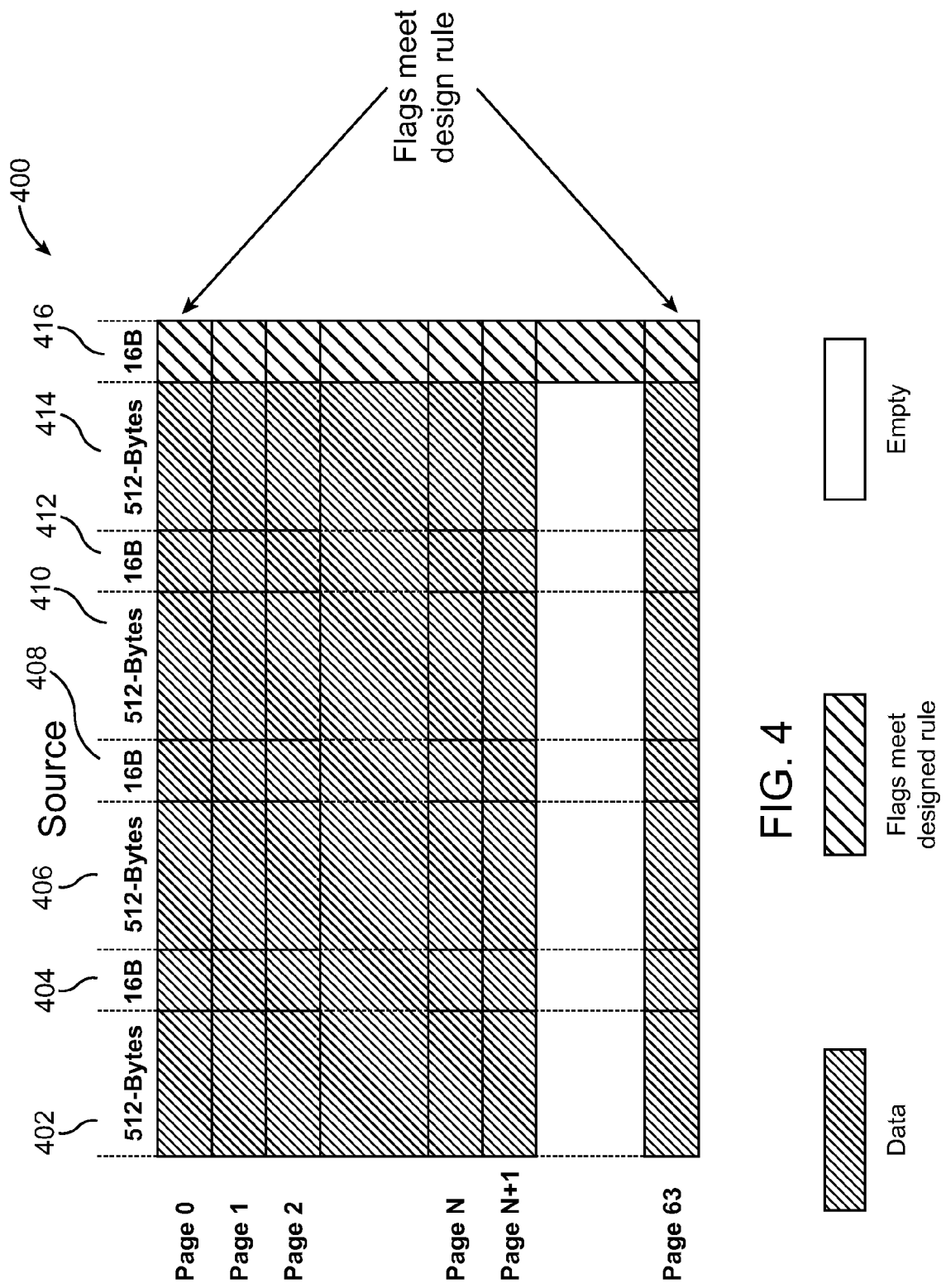

FIGS. 4-7 show exemplary contents of the source and/or shadow blocks within the flash memory 204, of FIG. 2. In FIG. 4, an exemplary state of a source block 400 is shown. The block 400 is shown to include 64 pages, i.e. pages 0-N, N being an integer value. The pages of the block 400 identify the rows of the block 400 and the data or spare of each page identifies the columns of the block 400. Each of the pages 0-N is shown to comprise four sections of 512-byte of data and each of the latter is shown to have a corresponding 16-byte overhead. It should be noted that the size of data and spare and therefore the size of a page may be other than that indicated in FIG. 4 or other figures. Moreover, the number of sections of data and spare need not be four and may be other values.

Flag information, stored in the spare part of a page indicates whether the block within which the flag information is included is a source block, a shadow block, a defective block or an empty block. Various methods and techniques may be employed to effectuate such indication. One way to identify a source block is by checking the first and last pages of the block and particularly the flag information of the last spare part of the first and last pages of the block and determining whether the block is a source block if this checking reveals that information has already been written to the first and last pages of the block. A shadow block is identified by having its first page written but not its last page written. An empty block is identified if the first and last pages thereof are determined not to have been written thereto and a defective or "garbage" block is one whose flag information of its first and last pages do not reveal a valid state, such as source, shadow or empty. An empty block is one which has not been written since after the last erasure thereof.

In FIG. 4, each of the pages 0-N include four data sections, data 402, data 406, data 410 and data 414. Each of the data sections has a corresponding spare so that the data 402 has a corresponding spare 404 and the data 406 has a corresponding spare 408 and the data 410 has a corresponding spare 412 and the data 414 has a corresponding spare 416. Alternatively, the spares of each of the four data sections may be located after all of the sections rather after their corresponding data, as shown in FIG. 4. In FIG. 4, pages 0 through N+1 are shown to have information stored therein and page 63 is also shown to have been written thereto. Thus, the flag information of the first and last pages, as included in the spare 416 of pages 0 and 63 indicates that the block 400 is a "source" block because the first and last pages thereof have been written.

Figure 5:
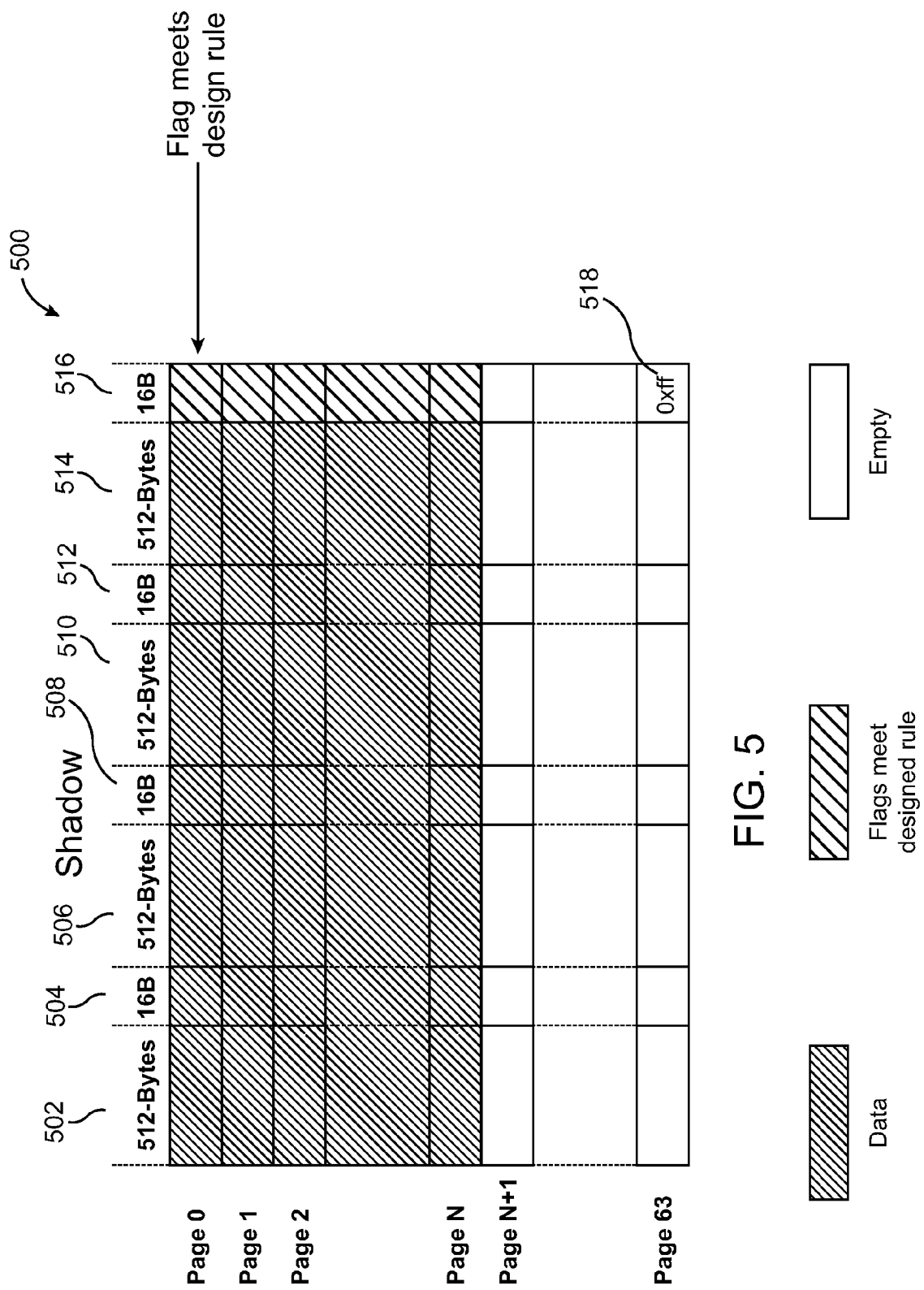

FIG. 5 shows an example of a "shadow" block 500 also including 64 pages, numbered 0-N and having four 512-byte data 502, 506, 510 and 514 and corresponding spare 504, 508, 512 and 516. Block 500 only has its pages 0 through N+1 written thereto, thus, its last page 63 remains empty, as indicated by the value 0xFF (in hexadecimal notation) at 518. Flash memory, once erased or never been written is in an all '1's binary state with all of its unprogrammed bits being '1' and when information is stored therein, the memory cells that are to take on values that are other than '1', i.e. '0' are accordingly programmed, otherwise, the memory cells remain '1's. Therefore, if a spare area is all '1's or (0xFF), it remains unprogrammed or unwritten.

Figure 6:
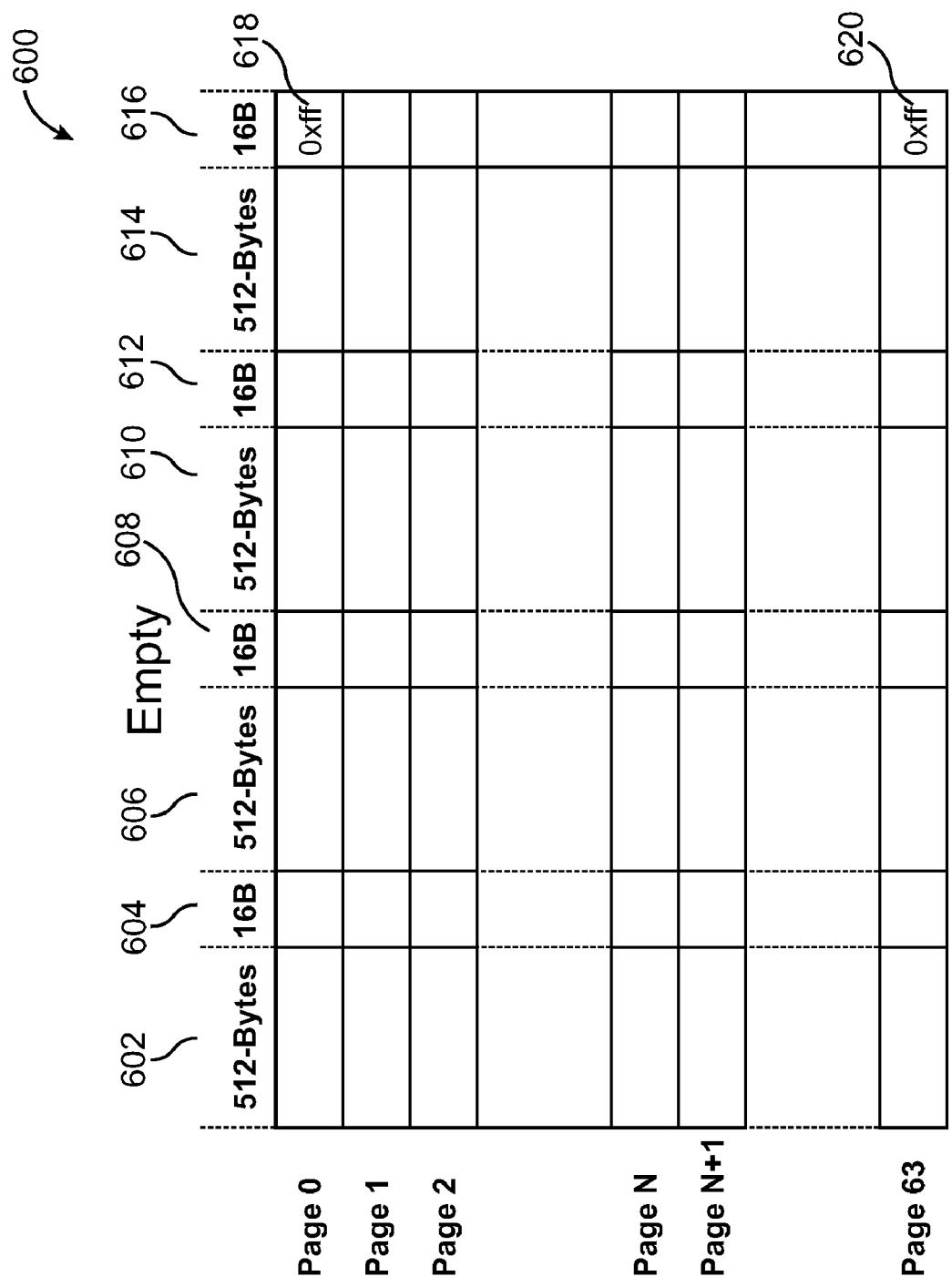

FIG. 6 shows an example of a "empty" block 600 also including 64 pages, numbered 0-N and having four 512-byte data 602, 606, 610 and 614 and corresponding spare 604, 608, 612 and 616. Block 600 has none of its pages 0 through 63 written thereto, thus, first and last pages, i.e. page 0 and page 63, remains empty, as indicated by the value 0xFF (in hexadecimal notation) at 618 and at 620.

Figure 7:
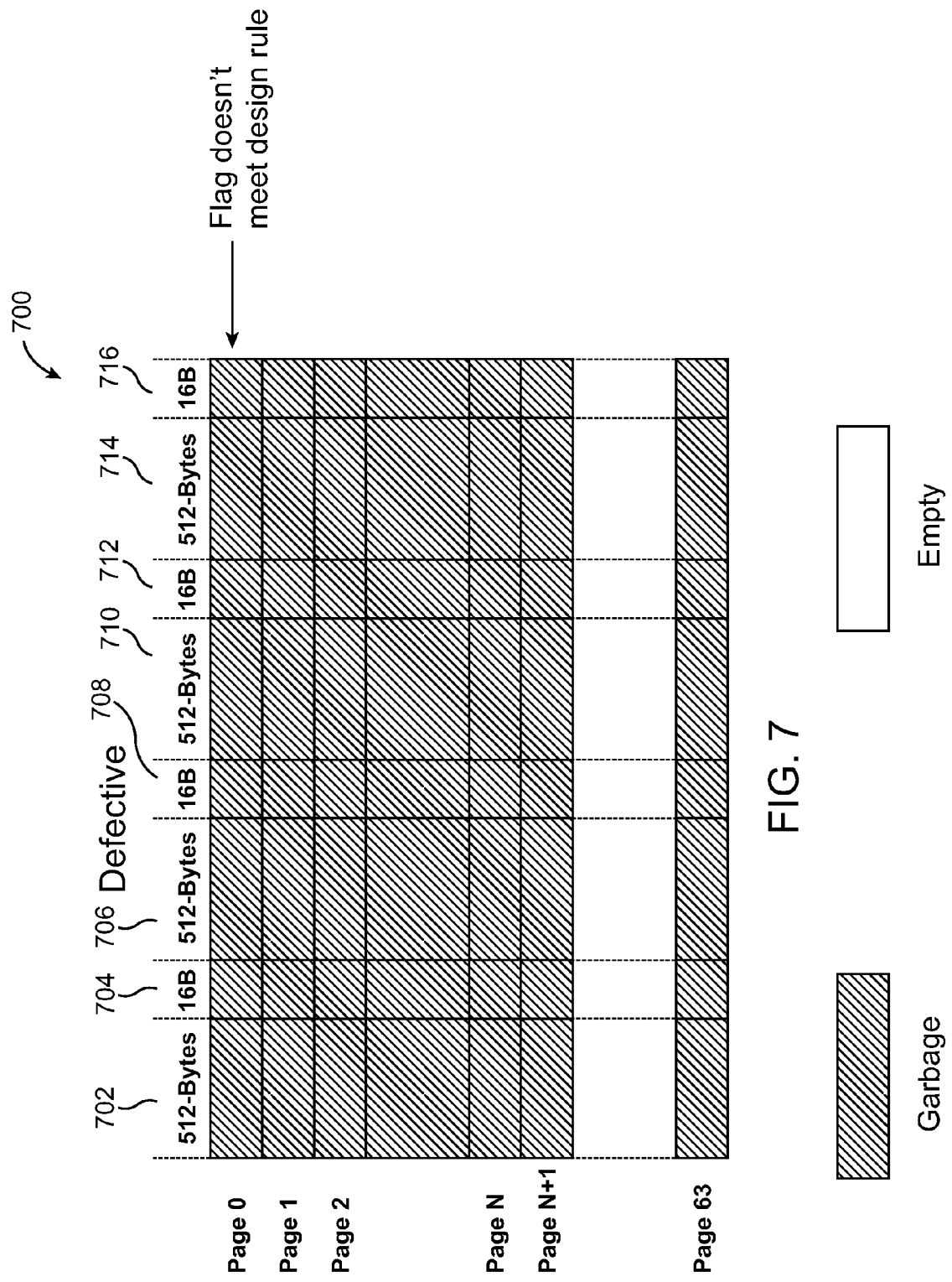

FIG. 7 shows an example of a "defective" block 700 also including 64 pages, numbered 0-N and having four 512-byte data 702, 706, 710 and 714 and corresponding spare 704, 708, 712 and 716. Block 700 includes flag information in its first and last pages, i.e. page 0 and page 63 in the example where a block includes 64 pages, that do not match any of the valid flag states, such as those discussed herein with reference to FIGS. 3-6, which is an indication that the block 700 is defective and cannot be used reliably for storage of information.

FIG. 8 shows a source-shadow table 800 including an address mapping table 802 and a property value table 804, in accordance with an embodiment of the present invention. The table 800 is stored in the volatile memory 240 of the controller 202 of FIG. 2 and is generally a look-up-table having rows and columns, addressable using physical addresses and at each location. The property table 804 is configured to store logical addresses of blocks to be read or written and identifiable by physical addresses, which are used to identify the block within the flash memory 204. The mapping table 802 and the property table 804, at any given time, include information regarding a predetermined group of blocks, such as a group of 256 blocks, which is generally the group of blocks recently frequently accessed by the host.

While a block is identified by a physical address within the flash memory 204, there may be more than one logical address used to identify a block by the controller 202, as will be evident shortly using examples. However, only one logical address is associated with a block having current or valid information.

By way of example, a block identified, by logical address '06', appears to be stored in both the physical address '0x0000' as well as the physical address '0x0001', as shown in the first row of the mapping table 802. While there are two physical locations in which the block identified by logical address '06' is stored within flash memory, only one of these blocks has valid or current information and the other block has, at most, partial valid information, which will be now discussed relative to the property table 804.

The property table 804 is used to store property value(s) associated with each block of the same predetermined group of blocks as that of the mapping table 802. This is perhaps best understood by way of an example. In FIG. 8, the property table 804 is shown to start at address 0x100 (in hexadecimal notation) and continue to address 0x1F0 (in hexadecimal notation). At address 0x100, the property value is shown to be '00' and at the adjacent address thereof, i.e. 0x101, the property value is shown to be '01'. The former property value, at location 0x100, is indicative of the state of a block, identified by logical block '06' which is stored within the mapping table 802, at location 0x000 and the property value of location 0x101 is indicative of the state of the same block, identified by logical address '06', which is stored at physical location 0x001, in the mapping table 802. In this manner, the property values of the table 804 correspond to the states of blocks, identified by a physical and logical address, in the table 802.

In the foregoing example, the property value '00' indicated that the corresponding block is a "source" block, thus, the block identified by logical address 06 and at physical location 0x000, in the table 802 is identified as a "source" block and the block identified by logical address 06 and at physical location 0x001, in the table 802, is identified as a "shadow" block. Therefore, the block identified by logical address 06 has been written thereto once during which the information being written was stored at location 0x000 in the flash memory and the same block, identified by logical address 06 was re-written but this time, the information being re-written was stored in a block identified at physical location 0x001, in the flash memory. A value of 'FF', as taken on by the property value indicated that the corresponding block is "empty" or not been written since it was erased. An example of the foregoing is shown at location 0x1F0 of the table 804 where the property value is 'FF', therefore, the corresponding block, located at 0x0F0, in the table 802, is an 'empty' block. A property value of 0xFE indicates a "defective" block, as shown by the example where the property value at location 0x120 of the table 804 is indicative of the block in location 0x020 of the table 802, having a logical address is "FE" and is defective. It should be noted that all valued indicated herein are in hexadecimal notation. Furthermore, the values taken on by property values, as indicated herein, such as '00', '01' and so on are merely examples and the property value can take on different values to indicate various states.

The states of blocks, as shown in FIG. 8, pertain to a predetermined group of blocks, such as, for example, 256 blocks in one group. A group is generally chosen for the source and shadow operation discussed herein by the frequency of its use as well as its recent use. For example, in the situation where the host is updating a file, such as a Word file, there is likely to be a specific area, in the flash memory, into which information is stored or read therefrom. Once the host has finished operating on the file, another area of flash memory may be frequently accessed in which case the information in the volatile memory of the controller, namely, the table 800 is updated to reflect information pertaining to the new file. To do so, the controller first obtains the current property value information and corresponding logical to physical address information (logical-physical address information), from the associated area where the current file is stored in the flash memory and stores the same in the table 800 with the property value information being stored in the table 804 and the logical-physical address information being stored in the table 802. The table 800 typically includes the tables 802 and 804, however, alternatively, the table 802 and 804 may be placed in different locations and different physical volatile memories.

Figure 9:
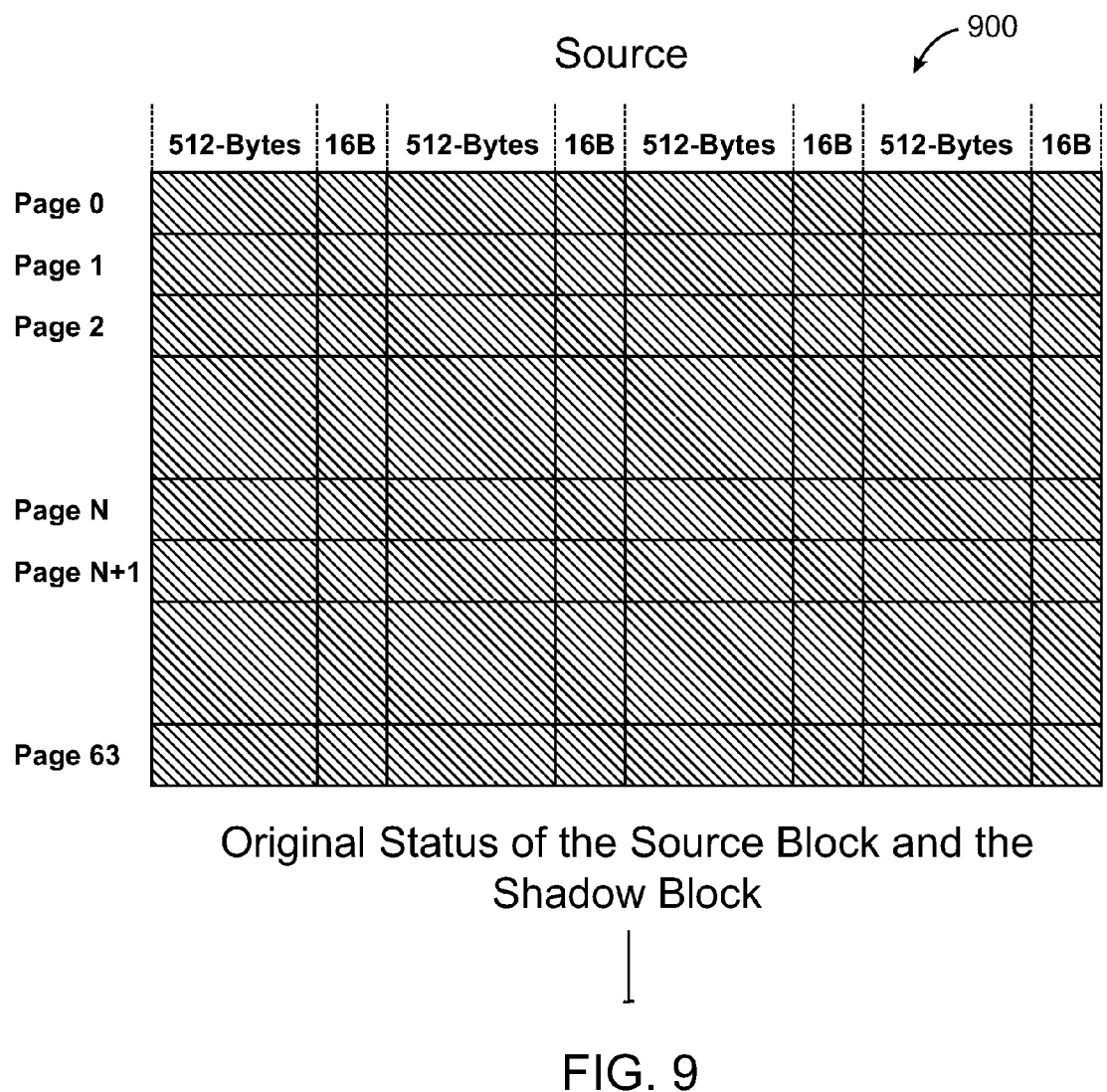
FIG. 9 shows an example of the contents of the flash memory during a re-write operation when the contents of a source block and the contents of a shadow block are merged, in accordance with an embodiment and method of the present invention.
Figure 9:
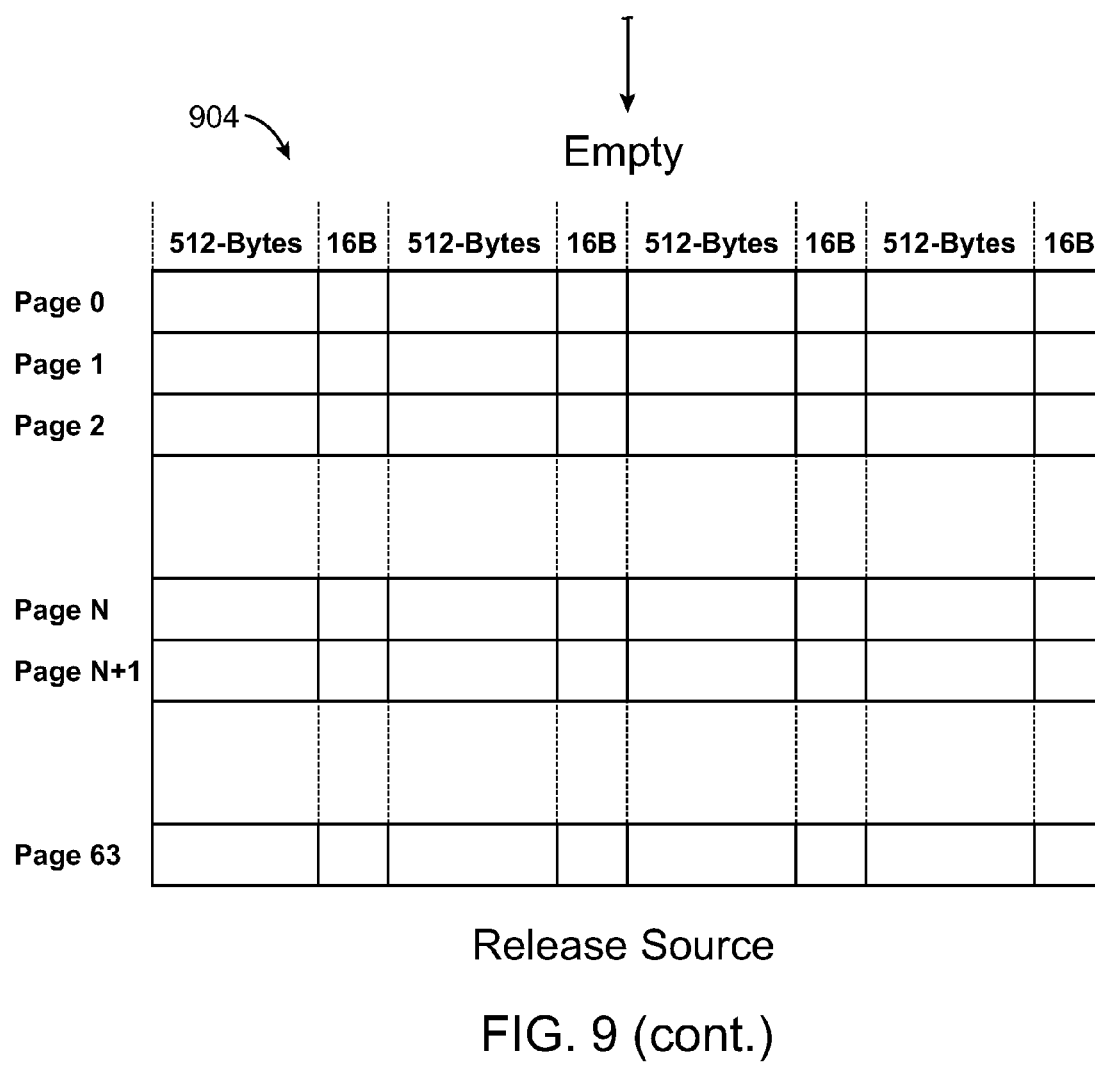
Figure 9:
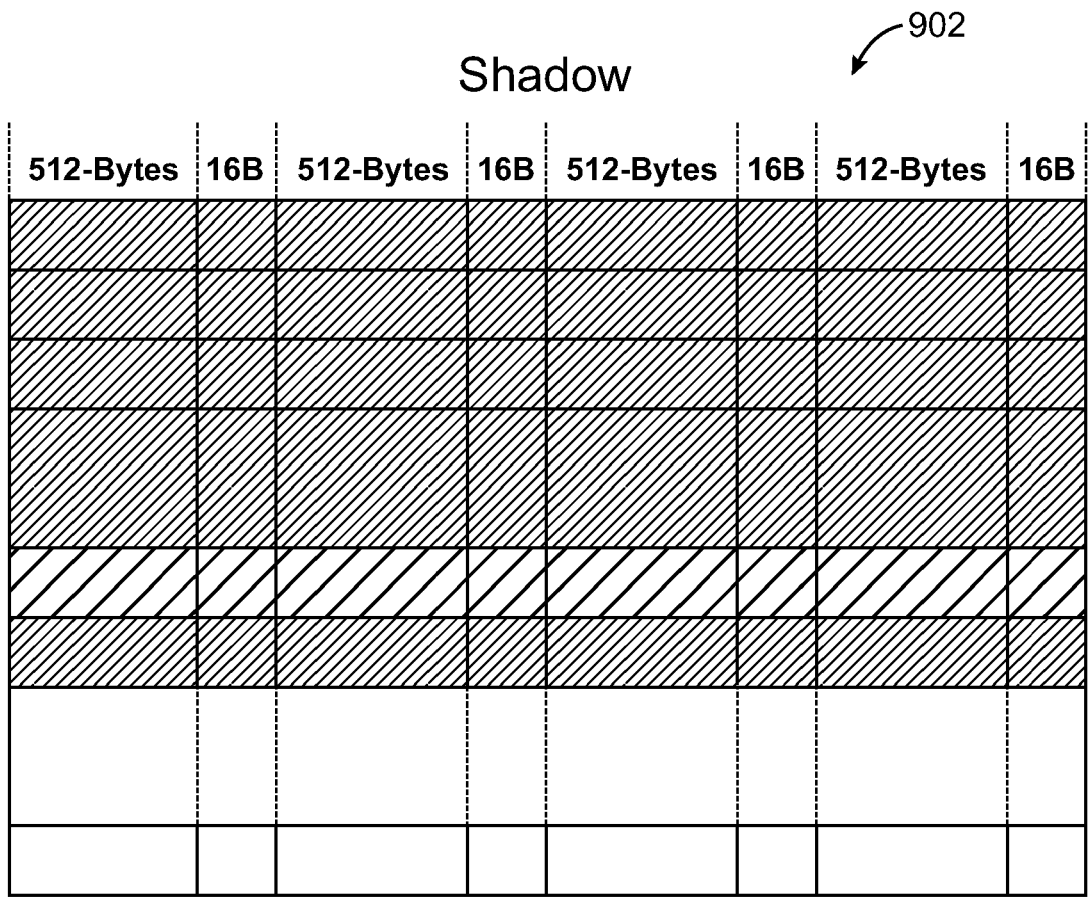
Figure 9:
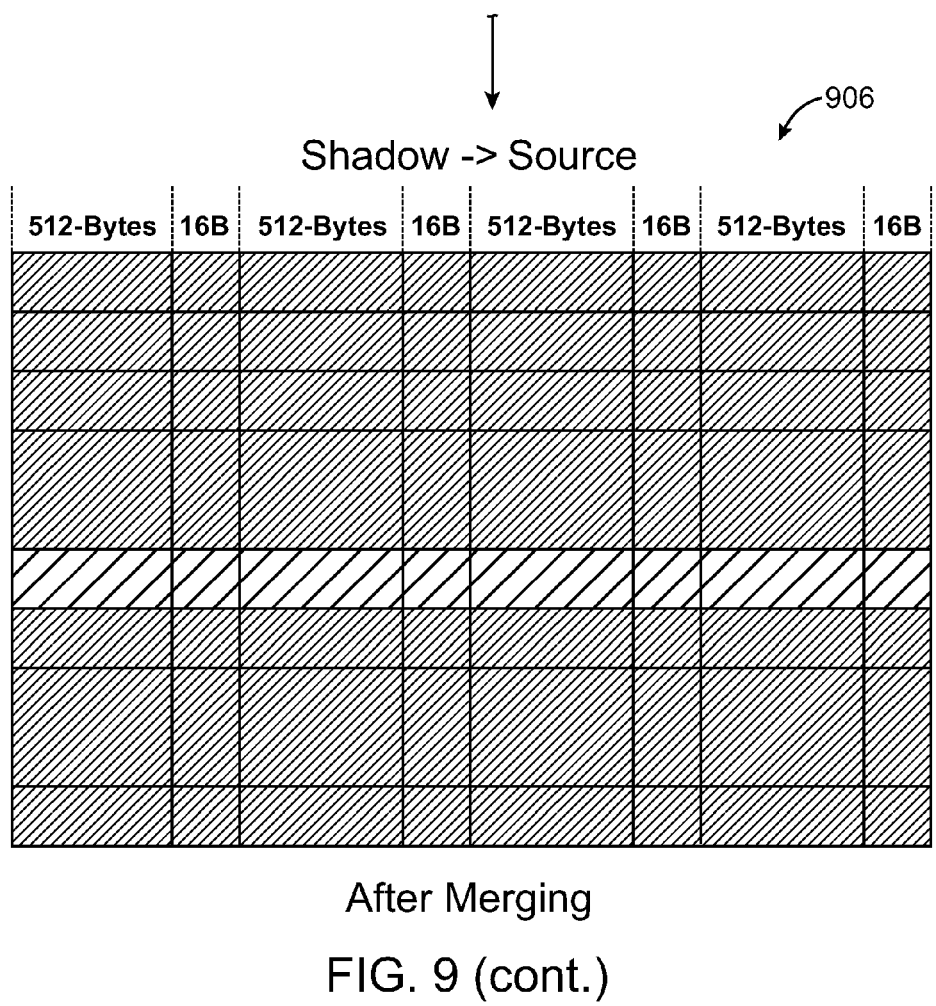
Figure 9:
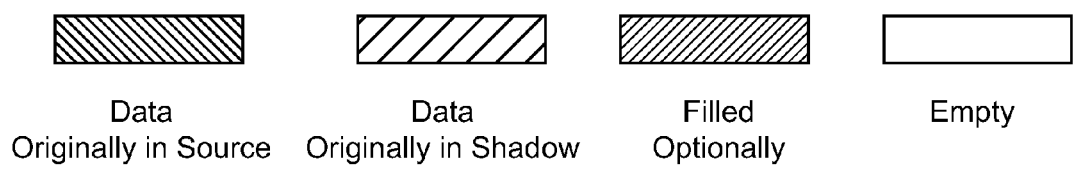

FIG. 9 shows an example of the contents of the flash memory during a re-write operation when the contents of a source block and the contents of a shadow block are merged, in accordance with an embodiment and method of the present invention. In FIG. 9, a "source" block 900 is shown to include 64 pages, a "shadow" block 902 is shown to also include 64 pages and identifies a block having a logical address that is in common with that of the block 900.

The block 904 is shown to be empty and is thus an empty block and the block 906 ultimately includes the information stored during a write operation as well as the information stored during a re-write operation as a result of merging the same, in a manner as follows. First, the block 900 is written or information stored therein after it was erased or the first time the system was powered on. The block 900 is identified by a particular logical address, as known to the controller, and is stored at a physical address within the flash memory. Next, the block, identified by the particular logical block, is re-written and because the physical address identifying the location, in flash memory, into which the source block is stored is now full or unavailable, updated information cannot be written thereto. Therefore, a "shadow" block or block 902 in flash memory is identified into which updated information, provided during the re-write operation, is stored. Next, the information in block 900 and 902 are merged into the block 906, which can occur in two ways. One way is to transfer the part of the information that was not re-written, such as pages after page N+1 to page 63, from the block 900 to corresponding page locations within the block 902 and then the block 900 may be erased, in which case its contents will be empty as shown by the block 904. That is, the blocks 900 and 904 are the same physical block, with the latter showing the state of the block after it has been erased and the former showing the state of the block prior to the erase operation. The foregoing will be referred to as a first method.

A second method is to merge the blocks 900 and 902 into another physical location within the flash memory, such as in the block 906. In this case, the pages of the block 900 that have not been affected by the re-write operation are transferred to the block 906 because they have current information and the pages that have been re-written are transferred from the block 902 are transferred to the block 906. This second method however, includes more transfers than the first method because pages from the blocks 900 and 902 are transferred whereas in the first method, only pages from the block 900 are transferred. In the first and second methods, ultimately and after the merger of the source and shadow blocks, the block 900 is erased and becomes the block 904. The blocks 904 and 906 also each have 64 pages. When the source and shadow blocks, 900 and 902, are merged, in one embodiment of the present invention, where they are merged into the block 902, once this is done, the block 900 is released and the block 902 is re-designated as a "source" block. In another embodiment of the present invention where the block 906 is the block into which the blocks 900 and 902 are merged, the block 906 is designated as a "source" block.

During wear leveling, both of the foregoing merge methods are advantageously used. That is, when a need arises for 'empty' or available blocks, the first method is used and when a physical address is re-written more than two times, or three times, the second method is used.

In FIG. 9, information regarding whether or not a page within a block has been written or is being written for a first time after an erase operation, appears in the spare of the sections of the corresponding page, as, for example, flag information. Moreover, logical addresses are stored in the spare of one or more pages of a corresponding block, by the controller, so as to correlate the physical and logical addresses relating to the block.

Figure 10:
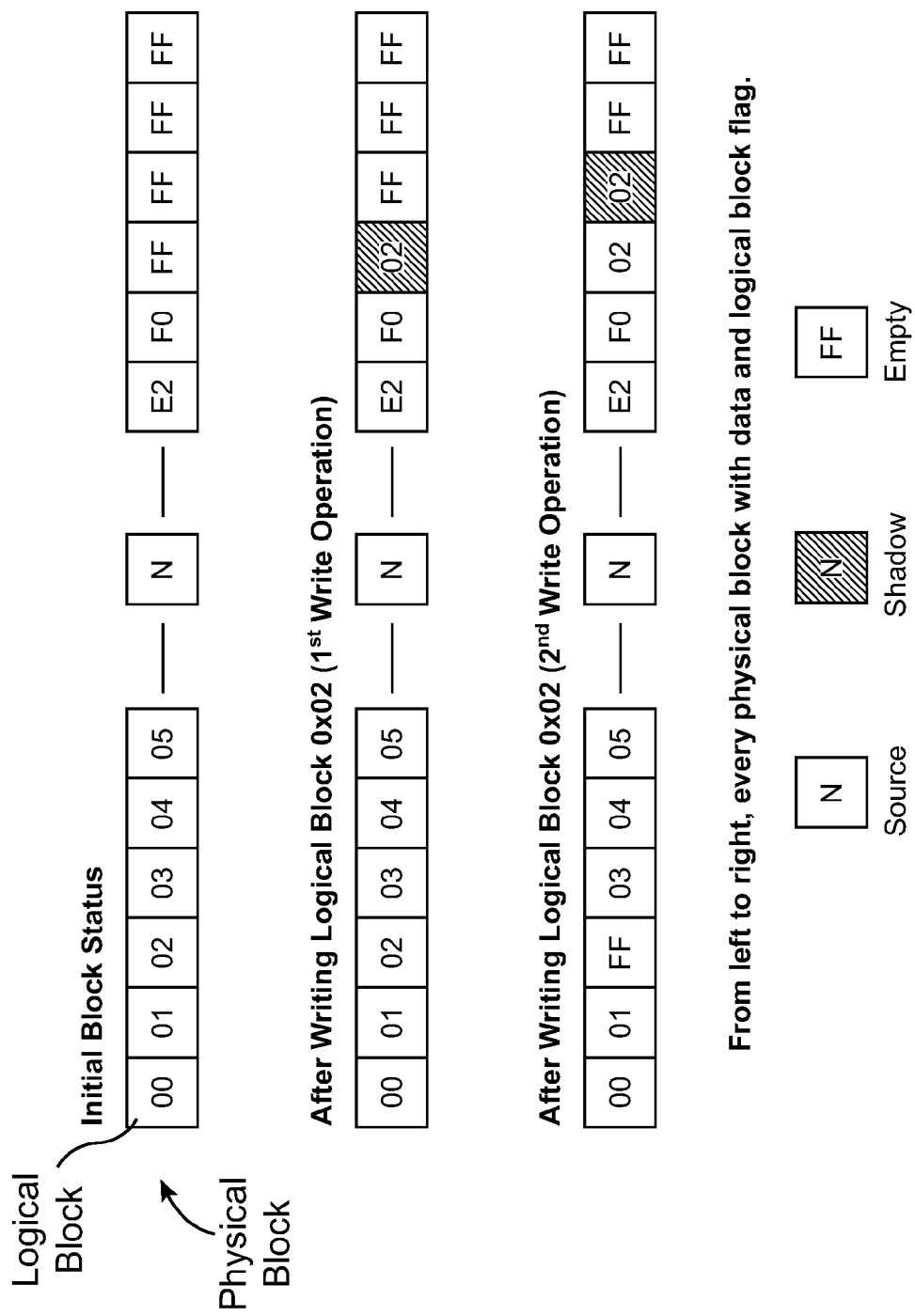
FIG. 10 shows an example of a write operation to a particular block, among blocks identified by logical addresses '00' to '05', N and E2, F0, FF, FF, FF and FF, and a re-write operation to the same particular block.

FIG. 10 shows an example of a write operation to a particular block, among blocks identified by logical addresses '00' to '05', N and E2, F0, FF, FF, FF and FF, and a re-write operation to the same particular block. Initially, the blocks '00' through '05' have information stored therein and have therefore been written, however, the last four blocks, are empty. Next, the block, identified by logical address '02' is written, thereafter, the same block is re-written (or written to a second time prior to being erased) but because there was a previous write to this block, the physical location into which the block is stored during this re-write is different than that used during the write thereby leading to the logical address appearing in another physical location during or after the re-write (or second write operation).

Figure 11:
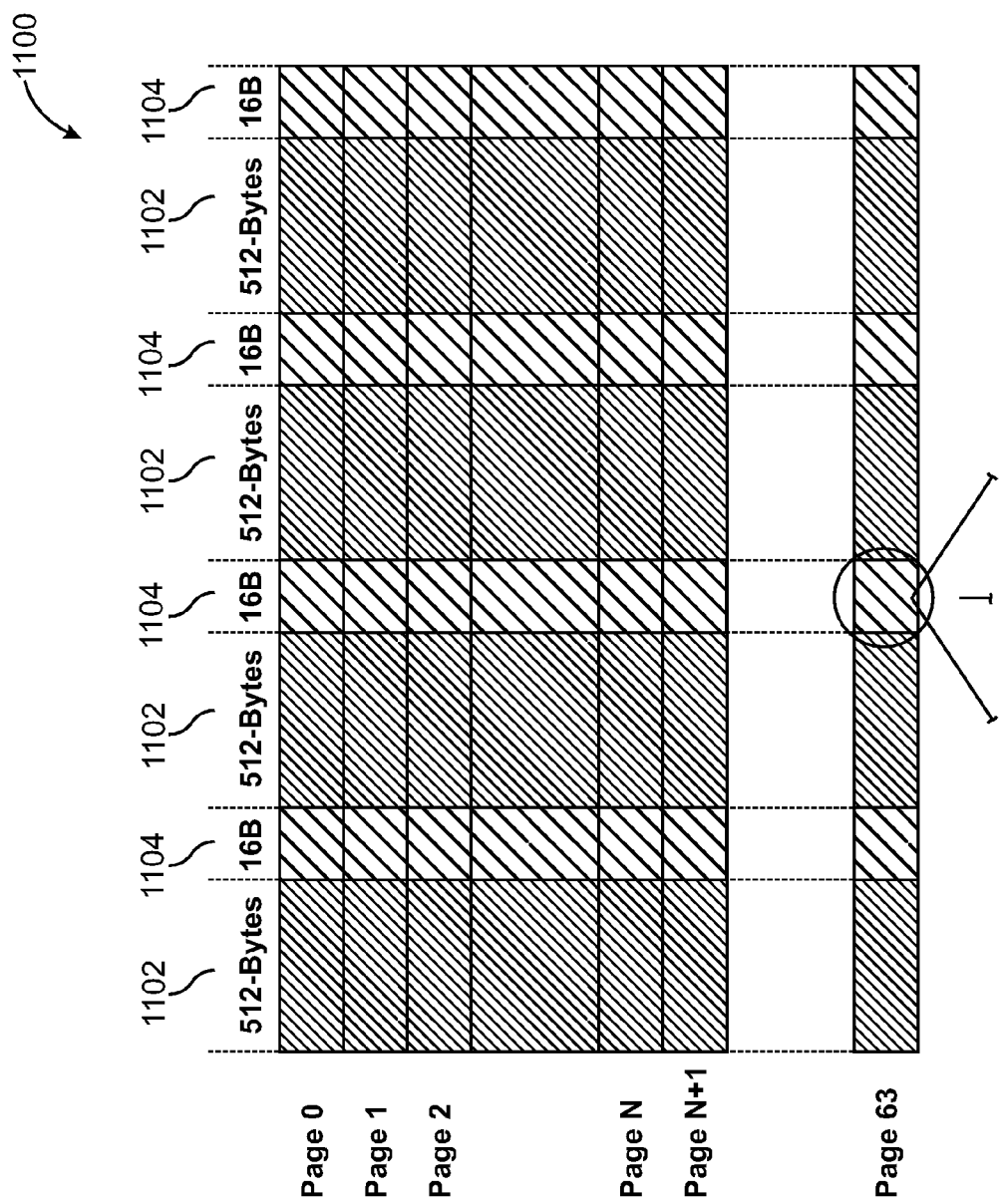
FIG. 11 shows an example of a block having 64 pages with each page including data and spare.
Figure 11:
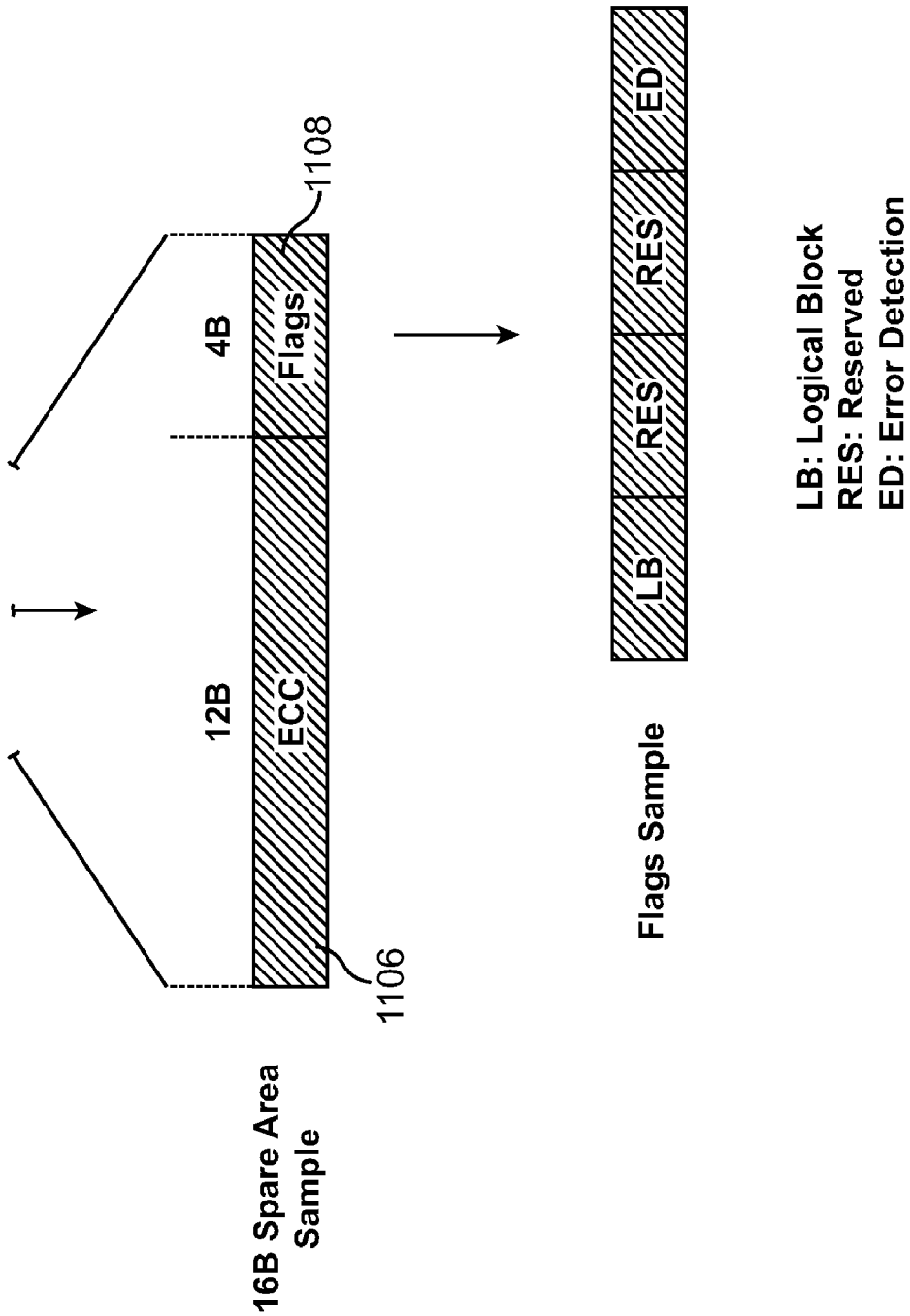

FIG. 11 shows an exemplary block 1100 to be used in any of the foregoing embodiments. The block 1100 is shown to include 64 pages with each page having four sections and each section including 512 bytes of data 1102 and 16 bytes of spare 1104. Further details of one of the spare is shown to include an ECC 1106, which is 12 bytes in this example, and flags 1108, which is 4 bytes in this example. The flag 1108 includes information associated with the block 1100, such as the logical address associated therewith, reserved area and error detection.

The various embodiments and method of the present invention may be employed for wear-leveling of NAND type of non-volatile or flash memory as well as MLC or SLC type of non-volatile or flash memory.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A flash memory system comprising:

flash memory organized into a plurality of blocks of pages, for storage of information, at least each of some of the pages including data and spare, the blocks being identifiable, within the flash memory, by a physical address; and a flash controller adapted to communicate with a host and the flash memory and including volatile memory configured to store a source-shadow table of logical addresses addressable by the physical addresses, the logical addresses identifying the blocks, by the controller, the source-shadow table having an address mapping table and a property value table, the property value table including property values, each of which is associated with a block of a predetermined group of blocks and indicative of the number of times a block has been written, the property values corresponding to the logical addresses of the address mapping table, wherein a block having been written no more than two times is re-written to different areas of the flash memory without requiring an erase operation, further wherein during power-up, the property values are used to construct the property value table to reflect the current status of the recent information stored in the predetermined group of blocks.

2. A flash memory system, as recited in claim 1, wherein the predetermined group of blocks is dictated by an area of flash memory to which the host is frequently recently accessing.

3. A flash memory system, as recited in claim 1, wherein the flash memory includes a source block, organized into pages and identified by information having been stored in the first and last pages thereof and the property value associated with the source block is used to identify the source block accordingly.

4. A flash memory system, as recited in claim 1, wherein the flash memory includes a shadow block, organized into page, that is identified by information having been stored in the first page thereof and the property value associated with the shadow block is used to identify the shadow block accordingly.

5. A flash memory system, as recited in claim 1, wherein an empty block is identified by the first and last pages thereof indicating lack of information having been stored therein since the last erase operation thereon.

6. A flash memory system, as recited in claim 1, wherein a defective block is identified by having information stored in its first and last pages being indicative of that which does not match that of an empty, source or shadow blocks.

7. A flash memory system, as recited in claim 1, wherein the first and last pages each include a spare and further wherein flag information is included in the spare of the first and last pages of a corresponding block for identifying status of the corresponding block.

8. A flash memory system, as recited in claim 1, wherein each page includes four sections of data and four sections of corresponding spare.

9. A flash memory system, as recited in claim 8, wherein each of the four data sections is 512 bytes.

10. A flash memory system, as recited in claim 8, wherein each of the four spares is 16 bytes.

11. A flash memory system, as recited in claim 8, wherein corresponding spares of a data section are stored adjacent to the data section.

12. A flash memory system, as recited in claim 8, wherein the spare sections are stored after the data sections.

13. A flash memory system, as recited in claim 1, wherein the flash memory is NAND flash memory.

14. A flash memory system, as recited in claim 1, wherein the flash memory is multi-level cell (MLC).

15. A flash memory system, as recited in claim 1, wherein the flash memory is single level cell (SLC).

16. A flash controller comprising:
a flash controller adapted to communicate with a host and a flash memory, the flash memory organized into a plurality of blocks of pages, for storage of information, at least each of some of the pages including data and spare, the blocks being identifiable, within the flash memory, by a physical address; the controller including volatile memory configured to store a source-shadow table of logical addresses addressable by the physical addresses, the logical addresses identifying the blocks, by the controller, the source-shadow table having an address mapping portion and a property value portion, the property value portion including property values, each of which is associated with a block of a predetermined group of blocks and indicative of the number of times a block has been written, the property values corresponding to the logical addresses of the address mapping portion, wherein a block having been written no more than two times is re-written to different areas of the flash memory without requiring an erase operation, further wherein during power-up, the property values are used to construct the table to reflect the current status of the recent information stored in the predetermined group of blocks.

17. A flash controller, as recited in claim 16, wherein the predetermined group of blocks is dictated by an area of flash memory to which the host is frequently recently accessing.

18. A flash controller, as recited in claim 16, wherein a source block, included in the flash memory and organized into page and identified by information having been stored in the first and last pages thereof and the property value associated with the source block identifies the source block accordingly.

19. A flash controller, as recited in claim 16, wherein a shadow block, included in the flash memory and organized into page, is identified by information having been stored in the first page thereof and the property value associated with the shadow block the shadow block being accordingly.

20. A flash controller, as recited in claim 16, wherein an empty block is identified by the first and last pages thereof indicating lack of information having been stored therein.

21. A flash controller, as recited in claim 16, wherein a defective block is identified by having information stored in its first and last pages being indicative of that which does not match that of an empty, source or shadow blocks.

22. A flash controller, as recited in claim 16, wherein the first and last pages each include a spare and further wherein flag information is included in the spare of the first and last pages of a corresponding block for identifying status of the corresponding block.

23. A flash controller, as recited in claim 16, wherein each page includes four sections of data and four sections of corresponding spares.

24. A flash controller, as recited in claim 23, wherein each of the four data sections is 512 bytes.

25. A flash controller, as recited in claim 23, wherein each of the four spares is 16 bytes.

26. A flash controller, as recited in claim 23, wherein corresponding spares of a data section are stored adjacent to the data section.

27. A flash controller, as recited in claim 23, wherein the spare sections are stored after the data sections.

28. A method of wear-leveling used in a flash memory system comprising:
receiving information to be written into a block of flash memory, the flash memory organized into a plurality of blocks of pages, for storage of information, at least each of some of the pages including data and spare, the blocks being identifiable, within the flash memory, by a physical address;
determining whether the received block of information has been updated without having been erased since the last time it was written;

upon determining that the received block of information has not been updated since it was last written, writing the received block of information into a "source" block within the flash memory, identified by a first physical address, wherein the source block is identified by having both its first page and last page written; and upon determining that the received block of information has been previously updated, writing the received block of information into a "shadow" block, within the flash memory, identified by a second physical address different than the first, wherein the shadow block is identified by having its first page written but not its last page written.

29. A method of wear-leveling, as recited in claim 28, wherein the first and last pages each include a spare and further including the steps of powering up the flash memory system, detecting "shadow" blocks by reading the spare of the first and last page of each block of the predetermined group of blocks, and reconstructing a source-shadow table based thereupon.

* * * * *